United States Patent
Tietze et al.

(10) Patent No.: US 9,566,932 B2
(45) Date of Patent: Feb. 14, 2017

(54) FIXING DEVICE AND AIR BAG MODULE

(71) Applicant: TRW Automotive GmbH, Alfdorf (DE)

(72) Inventors: Hans-Joachim Tietze, Heubach (DE); Tobias Klenk, Bobingen (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/888,216

(22) PCT Filed: May 16, 2014

(86) PCT No.: PCT/EP2014/001314
§ 371 (c)(1),
(2) Date: Oct. 30, 2015

(87) PCT Pub. No.: WO2014/187541
PCT Pub. Date: Nov. 27, 2014

(65) Prior Publication Data
US 2016/0075300 A1    Mar. 17, 2016

(30) Foreign Application Priority Data

May 21, 2013   (DE) .................. 10 2013 008 467
Apr. 29, 2014   (DE) .................. 20 2014 003 512 U

(51) Int. Cl.
*B60R 21/213*   (2011.01)
*B60R 21/232*   (2011.01)
(Continued)

(52) U.S. Cl.
CPC .......... *B60R 21/213* (2013.01); *B60R 21/217* (2013.01); *B60R 21/232* (2013.01); *B60R 21/237* (2013.01); *B60R 21/23138* (2013.01)

(58) Field of Classification Search
CPC .... B60R 21/214; B60R 21/213; B60R 21/232; B60R 21/217; B60R 21/2171
See application file for complete search history.

(56) References Cited

U.S. PATENT DOCUMENTS

| | | | |
|---|---|---|---|
| 9,321,417 B1* | 4/2016 | Lepper | B60R 21/213 |
| 2006/0255568 A1* | 11/2006 | Demel | B60R 21/213 |
| | | | 280/728.2 |
| 2012/0313355 A1 | 12/2012 | Grabowski et al. | |

FOREIGN PATENT DOCUMENTS

| | | |
|---|---|---|
| DE | 102006041704 | 3/2008 |
| DE | 102007039073 | 4/2008 |

(Continued)

*Primary Examiner* — Ruth Ilan
(74) *Attorney, Agent, or Firm* — Tarolli, Sundheim, Covell & Tummino LLP

(57) ABSTRACT

The invention describes a mounting device (10) for a folded side airbag comprising a receiving portion (12) encompassing the folded part of the airbag (46) in a substantially ring-shaped manner which receiving portion can adopt an inserting state for inserting the airbag (40) and a mounted state in which the mounting device (10) retains the airbag (40) by encompassing the same. The mounting device (10) further includes a flange portion (14) for arranging the mounting device (10) on the car body side which comprises a base plate (26) and a fixing plate (28) being coupled to each other in the mounted state. Moreover, the mounting device (10) includes a partition panel (20) for separating at least one outer layer (44) of the airbag package (46) from the residual airbag package (46) and for clamping the at least one outer layer (44) which between an outer wall (16) of the receiving portion (12) and the separating wall (20) projects into the receiving area (18). Furthermore an airbag module (38) comprising a mounting device (10) is suggested.

20 Claims, 5 Drawing Sheets

(51) Int. Cl.
*B60R 21/237* (2006.01)
*B60R 21/217* (2011.01)
*B60R 21/231* (2011.01)

(56) References Cited

FOREIGN PATENT DOCUMENTS

| WO | 2008028646 | 3/2008 |
| WO | 2008109396 | 9/2008 |
| WO | 2009059668 | 3/2009 |

\* cited by examiner

FIXING DEVICE AND AIR BAG MODULE

RELATED APPLICATIONS

This application corresponds to PCT/EP2014/001314, filed May 16, 2014, which claims the benefit of German Applications Nos. 10 2013 008 467.9, filed May 21, 2013 and 20 2014 003 512.1, filed Apr. 29, 2014, the subject matter of which are incorporated herein by reference in their entirety.

BACKGROUND OF THE INVENTION

The invention relates to a mounting device for a folded side airbag as well as to an airbag module comprising at least one mounting device.

Airbags are installed in safety systems in a folded condition so that they have a defined expansion in the case of release and can be stored in a space-saving manner. The airbags folded into an airbag package have to be safely retained in their folded state. For this purpose, from the state of the art mounting devices are known for clamping the folded airbag in its folded condition so that the latter is retained in its folded condition. The known mounting devices typically include a ring-type receiving portion for receiving the folded airbag. So as to enable quick and directed deployment in the case of head-side airbags, increasingly types of folding are used in which one or more zigzag folds are combined with an adjacent rolled fold. The uppermost portion of the airbag in the mounted state usually is fixed to the vehicle by plural straps and mounting devices. The adjacent upper airbag portion, the outer layer, is folded into one or more zigzag folds. The airbag portion adjacent thereto is rolled. For ensuring the advantages of rapid gas distribution and directed deployment by the combination of zigzag folding and roiled folding it is necessary to secure the exact position of the folded package in the vehicle. It is especially important in this case to maintain the exact orientation of the upper airbag portion including the zigzag folding. For this purpose, it is known from prior art to fix the folded airbags in the mounting devices at the correct position by means of tapes. In the case of head-side airbags, these are fastened to spaced positions along the roof frame via clamp-type mounting devices.

The tapes have to be arranged manually on the assembly line, which correspondingly increases the assembling effort.

SUMMARY OF THE INVENTION

It is the object of the invention to provide fixing of the folded side airbag having a zigzag folded outer layer and an adjacent rolled portion at the correct position in a mounting device by simple means.

The object of the invention is achieved by a mounting device for a folded side airbag having a zigzag folded outer layer and an adjacent rolled portion, comprising a receiving portion which encompasses the part of the airbag folded into an airbag package substantially in ring shape and which is adapted to adopt an inserting state for inserting the airbag and a mounted state in which the mounting device retains the airbag by encompassing the same, and comprising a flange portion for arranging the mounting device on the car body side which includes a base plate and a fixing plate being coupled to each other in the mounted state, wherein a partition panel provided for separating at least one outer layer of the airbag package from the residual airbag package and for clamping the at toast one outer layer between an outer wall of the receiving portion and the partition panel protrudes into the receiving portion.

It is the principal idea of the invention to design a mounting device so that the folded airbag is orientated already at the correct position by insertion in the mounting device and is then fixed at the correct position by closing the mounting device and, resp., transferring it into the mounted state. The partition panel provides at the same time an axial support and a radial anti-twist protection for the airbag package. The mounting device can be coupled to the airbag already in the roll-folding system where the airbag is folded into the airbag package so that the tapes provided in prior art for positional orientation of the folded airbag are no longer required. Thus the assembly is greatly facilitated as the manual fastening of the tapes can be dispensed with.

One aspect of the invention provides that the partition panel extends from one outer wall of the receiving portion into the receiving area and especially perpendicularly to the adjacent outer wall portion. In this way the movement of the airbag relative to the mounting device is even more inhibited, as the partition panel is coupled to the receiving portion so that no relative movement between the partition panel and the receiving portion may occur. Instead of a relatively wide partition panel, also two or more narrow partition panels or partition lands may be distributed over the entire width of the fastening portion.

In accordance with another aspect of the invention, the partition panel has a resilient design, and is especially designed to be resiliently biased. The airbag package acts on the resilient partition panel so that clamping of the at least one outer layer of the folded airbag is enhanced. Accordingly, the clamping force is provided by the airbag, especially the airbag package, itself. Alternatively, the partition panel can also be resiliency biased so that the partition panel itself generates a clamping force which applies efficient clamping of the at least one outer layer of the folded airbag.

Furthermore, in the fixing plate of the adjacent end of the receiving portion a cut-out may be provided through which a mounting strap of the airbag can be guided. Here the assembly of the folded airbag inside the mounting device can be facilitated as no predefined clamping force is required between the base plate and the fixing plate for generating efficient clamping of the mounting strap of the airbag. Hence the mounting strap of the airbag is guided in the area of the flange portion to an outside of the mounting device, for example, where it can be secured by simple means, for example during body-side assembly.

Another aspect of the invention provides that the mounting device can be unfolded for inserting the airbag and/or that on the fixing plate at least one pre-fixing element is provided which extends through at least one opening in the base plate in the mounted state, especially for maintaining the closed mounted state of the mounting device. Of course, the pre-fixing element may as well be formed inversely on the base plate. The assembly of the folded airbag in the mounting device is thus further facilitated, as the mounting device can be simply closed after insertion of the folded airbag. The prefixing element ensures safe storage of the folded airbag inside the mounting device so that a movement of the airbag relative to the mounting device during transport of the mounting device and of the airbag accommodated therein is prevented. The pre-fixing element may especially be a mounting clip which prevents the pre-fixation from being inadvertently released.

The object of the invention is equally achieved by a mounting device for a folded side airbag comprising a zigzag folded outer layer and an adjacent rolled portion in which the mounting device includes at least one shaping portion having a contact surface which may be adjacent to, especially may be adjacent by pressing against an outer portion of the airbag package. Due to the pressure, the shape of the airbag package can be appropriately adjusted via the shaping portion so that, on the one hand, a defined deployment behavior of the airbag is resulting and, on the other hand, force is transmitted from the outer portion to the opposite outer portion of the airbag package. Said force is transmitted through the airbag package to the opposite outer portion and from there to the partition panel so as to efficiently clamp the at least one outer layer of the folded airbag.

The shaping portion may be a part of the receiving portion, especially a curved land, protruding into the receiving area. In this way a simple configuration of the shaping portion is provided which can introduce the counterforce originating from the airbag package into the mounting device.

In particular, the shaping portion is opposed to the partition panel at least in the mounted state as regards the clamping of the at least one outer layer between the shaping portion and the partition panel. Due to the inwardly curved design, an additional positional fixation can be realized via the shaping portion.

An especially efficient positional fixation, in particular in difficult mounting conditions having a multi-bent extension, is obtained by a mounting device with a combination of partition panel and shaping portion.

Another aspect of the invention provides that the mounting device is configured in one piece, and is especially an injection-molded part. This reduces the assembling effort as the mounting device need not be assembled. Moreover, the configuration as an injection-molded part is inexpensive. In addition, the stability of the mounting device is increased due to the one-piece design.

The invention further relates to an airbag module comprising at least one mounting device of the afore-described type and a folded airbag having a least one outer layer of the folded airbag package and a mounting strap adjacent to the outer layer. Due to the mounting device according to the invention, the airbag module can be manufactured especially quickly and easily, because the airbag can be coupled to the mounting device in the roll-folding system.

It is especially provided that the receiving portion encompasses and clamps the airbag package. Thus the folded airbag package is safely accommodated.

Another aspect of the invention provides that the at least one outer layer is fixed, and especially clamped, between the partition panel and the outer wall of the receiving portion. Thereby an anti-twist protection is produced which prevents the folded airbag from moving relative to the mounting device. The anti-twist protection especially provides both radial and axial fixation of the folded airbag.

In accordance with a first embodiment, the mounting strap can be retained by clamping between the base plate and the fixing plate of the flange portion. The airbag is thus coupled to the mounting device with a predefined inflating behavior being adapted to be realized.

According to another embodiment, the fixing plate or the end of the clamping portion adjacent thereto includes a cut-out through which the mounting strap is guided such that it contacts the side of the fixing plate opposite to the base plate. The mounting strap is thus guided out of the mounting device in the area of the flange portion so that between the base plate and the fixing plate no predefined clamping force which enables the mounting strap to be safely fixed needs to be provided. The mounting strap guided out of the mounting device can be fixed on the side of the fixing plate opposite to the base plate by simple means.

Another aspect of the invention provides that the mounting strap includes at least one hole and the base plate includes at least one opening which are aligned with each other in the mounted state, the fixing plate having at least one projecting pre-fixing element which in the mounted state passes through the opening and the hole so that the airbag is pre-fixed and/or that the mounting device is kept closed. It is ensured by the pre-fixation that the airbag cannot move relative to the mounting device when the airbag module is transported for being installed in the vehicle, for example, and is held at different positions. The pre-fixation moreover ensures that the mounting device is not inadvertently opened, which might cause the accommodated airbag to fall out of the mounting device.

BRIEF DESCRIPTION OF THE DRAWINGS

Further advantages and characteristics of the invention will be evident from the following description and the drawings which are referred to and in which.

DESCRIPTION

Figure 1:
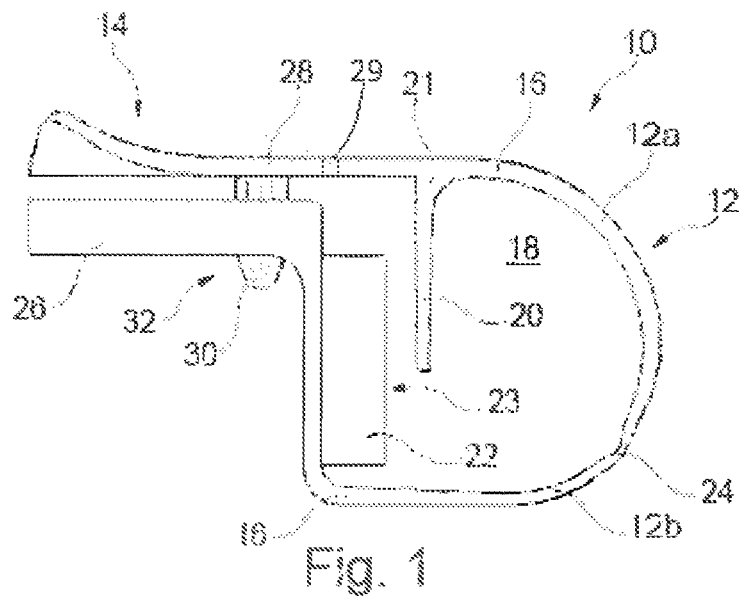
FIG. 1 shows a side view of a mounting device according to the invention in accordance with a first embodiment.
Figure 2:
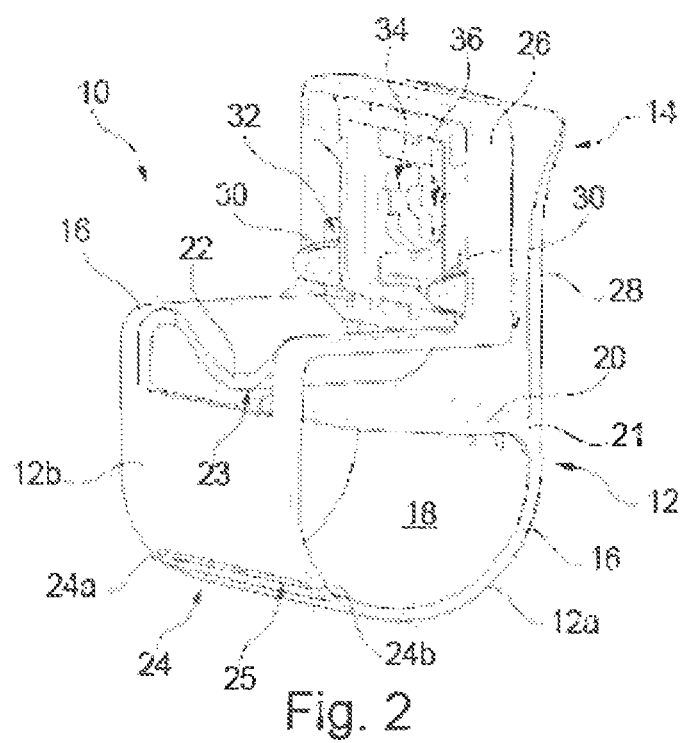
FIG. 2 shows a perspective view of the mounting device from FIG. 1.

In FIGS. 1 and 2 a clamp-type mounting device 10 for a folded airbag is shown in its mounted state. In particular plural devices 10 are provided spaced apart from each other for mounting a head-side airbag.

The mounting device 10 includes a receiving portion 12 and a flange portion 14 designed for arranging the mounting device 10 on the car body side.

The receiving portion 12 is configured to receive a folded airbag not shown here and comprises an outer wall 16 which substantially defines a receiving area 18 into which the folded airbag can be inserted, in the shown mounted state the receiving portion 12 has a substantially ring-shaped configuration.

The receiving portion 12 further includes a partition panel 20 extending from an outer wall portion 21 into the receiving area 18, especially perpendicularly to the outer wall portion 21 on which the partition panel 20 is based.

In addition, the receiving portion 12 comprises a shaping portion 22 including a contact surface 23 which is arranged opposite to the partition panel 20 in the shown embodiment.

The shaping portion 22 is part of the outer wall 18, wherein it is in the form of an inwardly curved land.

The functions of the partition panel 20 and of the shaping portion 22 shall be illustrated further below by way of the FIGS. 3 and 4.

Furthermore, it is evident from FIG. 1 that the receiving portion 12 includes a film hinge type pivoting portion 24 formed in the outer wall 16. The mounting device 10 can be transferred from an inserting state into the shown mounted state via the pivoting portion 24.

In the inserting state of the mounting device 10 a first part 12a of the receiving portion 12 is pivoted relative to a second part 12b of the receiving portion 12 about the pivoting portion 24 so that a clamp-type holding fixture is formed for the folded airbag, as will be explained hereinafter in detail.

The pivoting portion 24 can be a portion of weaker material, with the two parts 12a, 12b being bent for the transition from the inserting state to the mounted state. This can be taken especially from FIG. 2 which shows that the pivoting portion 24 is formed of two lands 24a, 24b with an interposed cut-out 25.

The flange portion 14 comprises a base plate 26 as well as a fixing plate 28 which are opposed in the mounted state. The base plate 26 and the fixing plate 28 are interconnected via the outer wall 16 of the receiving portion 12.

Accordingly, the mounted portion 10 can be formed especially in one piece, for example as an injection-molded part.

It is evident already from FIG. 1 that the fixing plate 28 includes at least one pre-fixing element 30 which in the mounted state extends through an associated opening 32 in the base plate 26. The pre-fixing element 30 interacts with the opening 32 and, resp., the border of the opening 32 inside the base plate 26 such that the mounting device 10 is safely retained in its mounted state.

The pre-fixing elements 30 may be especially mounting clips.

Furthermore, it is shown in FIG. 2 that a first mounting hole 34 is formed in the base plate 26 and a second mounting hole 38 is formed in the fixing plate 28 which are aligned with each other. The mounting device 10 can be fastened on the body side via its flange portion 14 in that a fastening means, for example a screw, is guided through the two mounting holes 34, 38.

Figure 3:
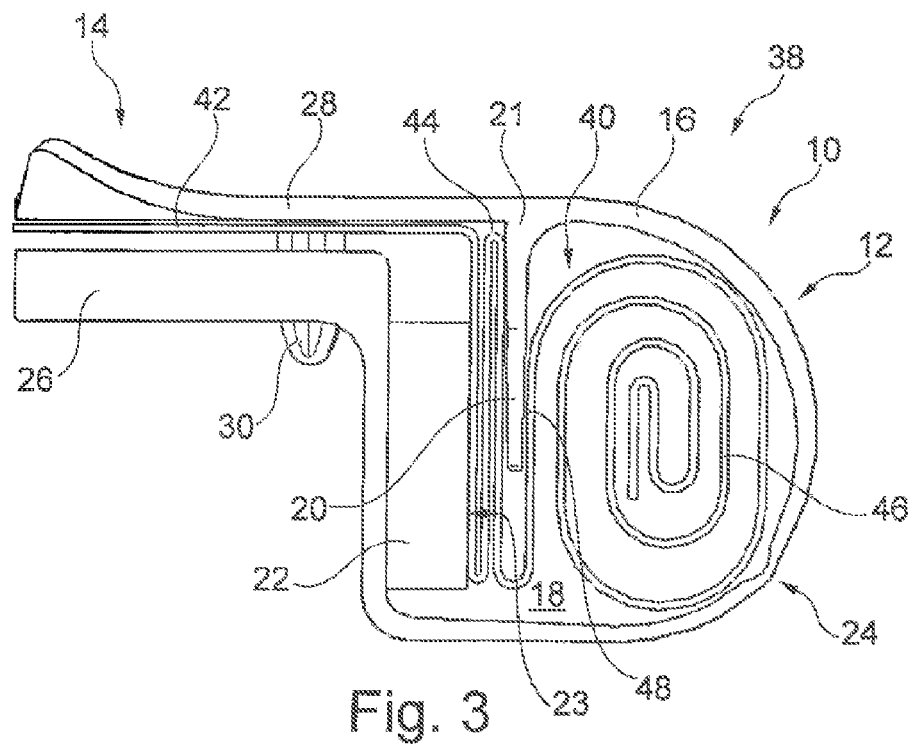
FIG. 3 shows a side view of an airbag module according to the invention comprising a mounting device according to FIGS. 1 and 2.
Figure 4:
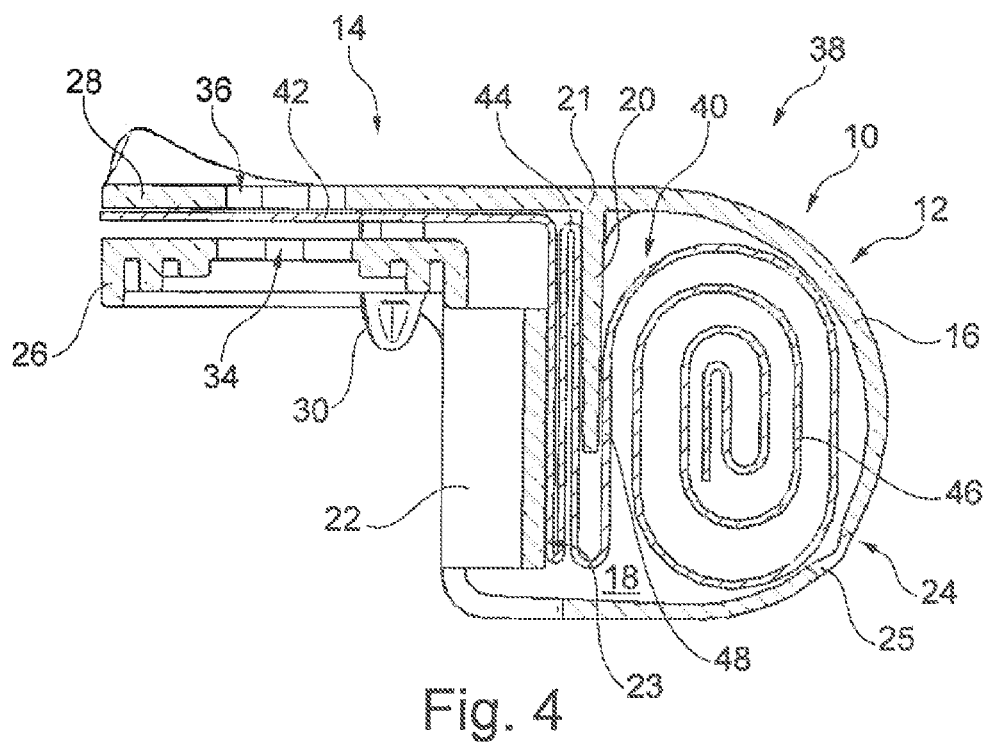
FIG. 4 is a cross-sectional view of the airbag module from FIG. 3.

In FIGS. 3 and 4 an airbag module 38 is shown which comprises a mounting device 10 according to FIGS. 1 and 2 as well as an elongate head-side airbag 40.

The airbag 40 is folded and is accommodated in the mounting device 10, with the airbag 40 comprising a mounting strap 42, an outer layer portion 44 as well as an airbag package 46.

The airbag package 46 is accommodated inside the receiving area 18 of the mounting device 10 so that the shape of the airbag package 46 is influenced by the outer wall 16 of the receiving portion 12. In the shown embodiment the airbag package 46 has a substantially oval shape.

The airbag package 46 includes an outer portion 48 interacting with the partition panel 20. The airbag package 46 is held by clamping in the receiving portion 12, as already afore-described, so that the outer portion 48 exerts force on the partition panel 20 causing the partition panel 20 to be urged away from the airbag package 46 due to its resilient configuration.

In this way the partition panel 20 clamps the outer layer portion 44 of the airbag 40 between itself and the shaping portion 22, especially the contact surface 23 thereof.

In the shown embodiment, the outer layer portion 44 has a total of three layers which are clamped in a tightly folded manner.

However, it is also possible to clamp only one single outer layer 44 between the shaping portion 22 and the partition panel 20. This is especially dependent on the dimensioning of the shaping portion 22 and the partition panel 20.

The mounting strap 42 extends from the outer layer portion 44 to the flange portion 14, in particular between the fixing plate 28 and the base plate 26.

In the shown embodiment, the mounting strap 42 is retained by clamping between the base plate 26 and the fixing plate 28, although a gap is shown between the fixing plate 28 and the base plate 26 for better illustration.

In an alternative embodiment, the mounting strap 42 can be guided out via a cut-out (see FIG. 1) in the fixing plate 28 so that it is located on a side of the fixing plate 28 opposite to the base plate 26. When the airbag module 38 is assembled on the body side, the mounting strap 42 guided out of the mounting device 10 is fixed by clamping between the fixing plate 28 and a car body side.

The mounting strap 42 further includes holes through which the pre-fixing elements 30 are protruding, thereby also the airbag 40, especially the mounting strap 42, being pre-fixed via the pre-fixing elements 30.

Figure 5:
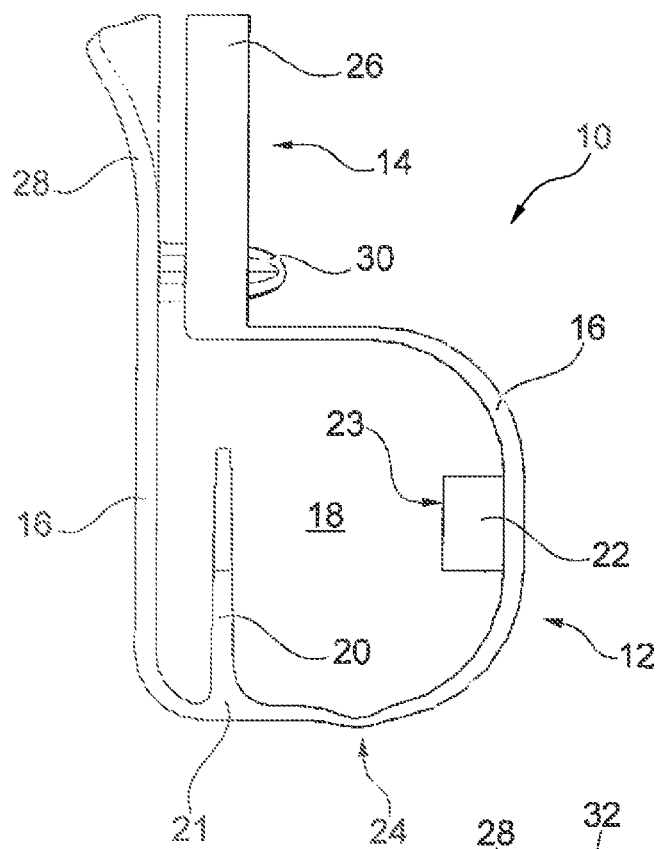
FIG. 5 is a side view of a mounting device according to the invention in accordance with a second embodiment.
Figure 6:
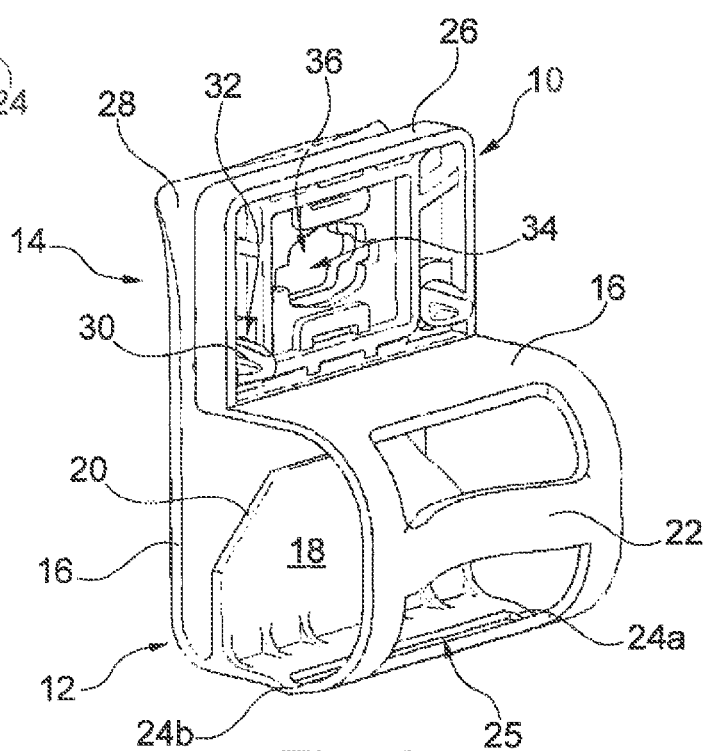
FIG. 6 is a perspective view of the mounting device from FIG. 5.
Figure 7:
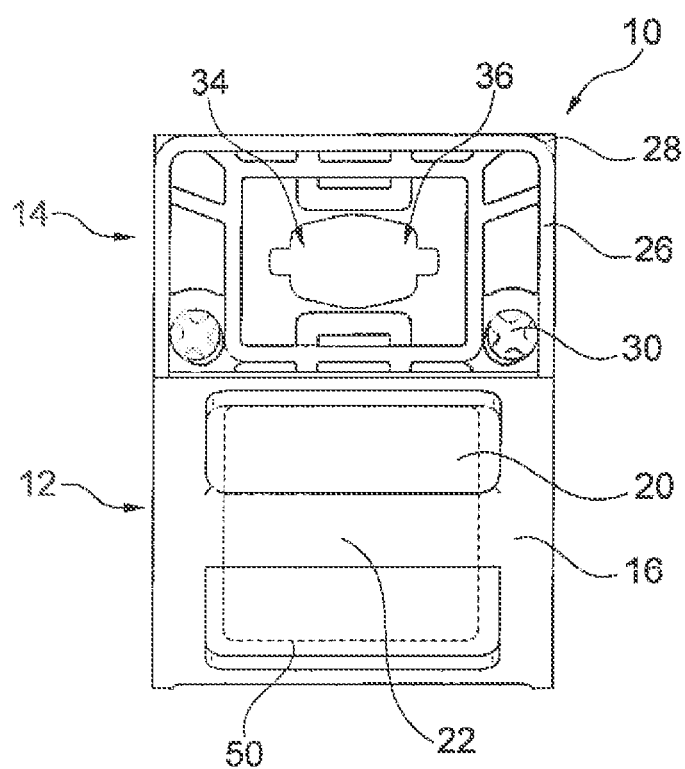
FIG. 7 is a top view onto the mounting device according to FIGS. 5 and 6.

In FIGS. 5 to 7 a second embodiment of the mounting device 10 is shown, wherein equal components are provided with the same reference numerals.

The second embodiment of the mounting device 10 differs from the first embodiment to the effect that the partition panel 20 is arranged in a different area of the receiving portion 14, especially at an outer wall portion 21.

Furthermore, in the second embodiment of the mounting device 10 the shaping portion 22 is arranged on an outer wall 16 of the receiving portion 12 which is opposite compared to the first embodiment.

FIG. 7 moreover illustrates in broken lines a spring element 50 adapted to interact with the outer layer portion 44 so as to urge the latter even more strongly toward the outer wall 16.

Said spring element 50 can further be configured even such that it adopts the complete clamping function, causing the spring element 50 to simultaneously form the partition panel 20.

The afore-described partition panel 20 constitutes a receiving space open to the top in the mounting position for the outer layer portion 44. A receiving portion open to the bottom for the outer layer portion can be formed by two narrow partition panels or partition lands which are bent inwardly and downwardly out of the upper area of the outer wall 16. These two partition lands are formed at the outer rim of each of the mounting device and the outer wall so that the mounting strap 42 of the airbag 40 is arranged between said two partition panels and, resp., partition lands.

The effects of the structural differences between the first and second embodiments of the mounting device 10 occur when the airbag 40 is inserted in the mounting device 10.

Figure 8:
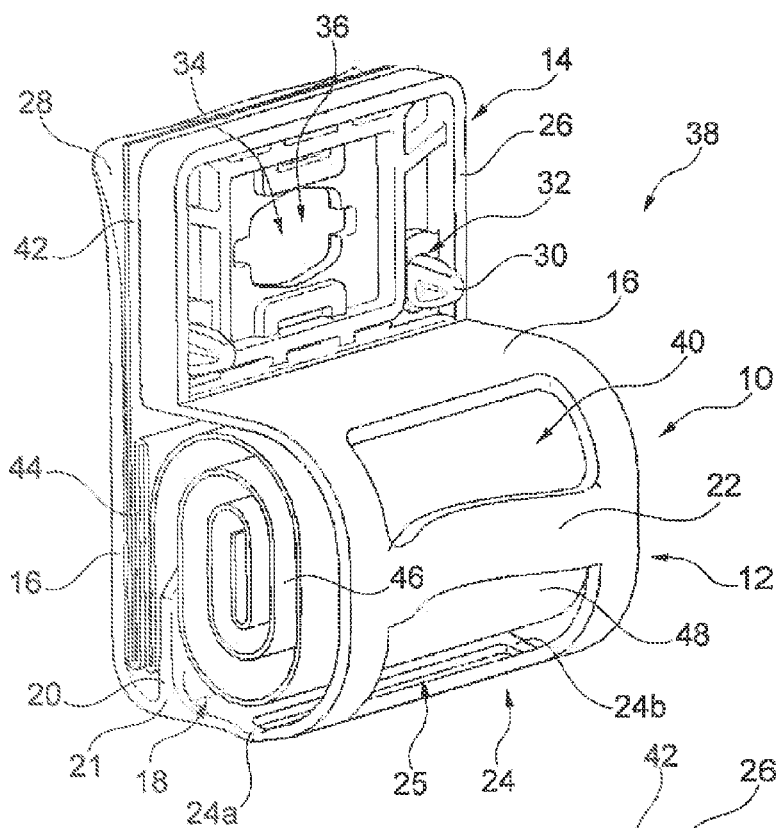
FIG. 8 shows a perspective view of an airbag module according to the invention in accordance with a second embodiment comprising a mounting device according to FIGS. 5 to 7.
Figure 9:
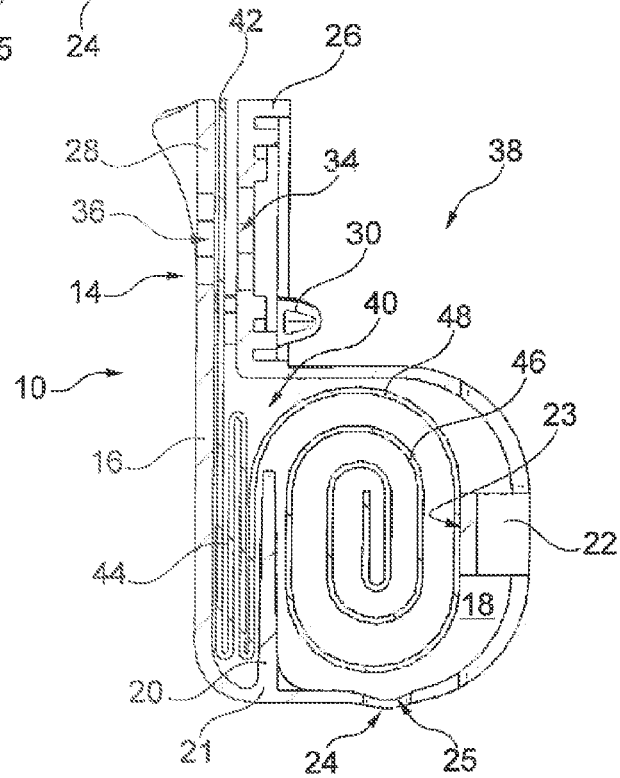
FIG. 9 shows a cross-sectional view of the airbag module from FIG. 8.

This is illustrated in FIGS. 8 and 9 showing an airbag module 38 according to a second embodiment the second embodiment of the airbag module 38 being different from the first embodiment in that the mounting device 10 is configured according to the second embodiment.

A comparison of FIGS. 3 and 4 as well as 8 and 9 emphasizes the differences of the second embodiment of the airbag module 38 from the first embodiment, because in the second embodiment the outer layer portion 44 is clamped between the partition panel 20 and an outer wall 16 of the receiving portion 12 which is not the shaping portion 22.

The partition panel 20 is forced, analogously to the first embodiment, via the airbag package 46 in the direction of the outer layer portion 44 of the airbag 44 so that the latter is retained by clamping.

The pressure exerted by the airbag package 46 is produced in the second embodiment especially by means of the shaping portion 22 which does not only define the shape of the airbag package 46 inside the receiving area 18 but at the same time projects into the receiving area 18 so that it urges the airbag package 46 in the direction of the partition panel 20. Then the partition panel 20 clamps the outer layer portion 44 in an analogous way.

In this embodiment the clamping force produced thus can be additionally defined via the shaping portion 22.

Furthermore, in both embodiments it may be generally provided that the partition panel 20 itself is resiliency biased so that it produces clamping of the outer layer portion 44 on its own.

The transfer of the mounting device 10 without the airbag 40 from an inserting state not shown here to an airbag module 38 will take place as follows:

The mounting device 10 is provided, as afore-described, in an opened state so that the receiving portion 12 is approximately bowl-shaped. The flange portion 14 is not closed, either, so that the base plate 28 and the fixing plate 28 are not opposed to each other.

The airbag 40 is provided in folded form already so that the airbag package 46 is inserted into the opened receiving portion 12. An outer layer portion 44 is taken from the airbag package 46 and is arranged on the other side of the partition panel 20 relative to the airbag package 46.

When the partition panel 20 is biased, it can be appropriately withdrawn so as to facilitate the insertion of the outer layer portion 44.

The mounting strap 42 adjacent to the outer layer portion 44 is placed to the side of the fixing plate 28 so that the at least one pre-fixing element 30 protrudes through the at least one opening in the mounting strap 42 and in this way pre-fixation takes place.

After that, the mounting device 10 is transferred to its mounted state by pivoting, especially bending, the second part 12*b* about the pivoting portion 24 relative to the first part 12*a*.

In this way the outer layer portion 44 is intermediately stored between the outer wall 16, especially the shaping portion 22, and the partition panel 20. Furthermore, the airbag package 46 is compressed in the now ring-shaped receiving portion 12 so that the airbag package 46 exerts force on the partition panel 20 which clamps the outer layer portion 44.

The folded airbag 40 is thus fixed in foe receiving portion 12 in a torsion-proof manner.

Furthermore, the base plate 28 and the fixing plate 28 are opposed to each other so that the at least one pre-fixing element 30 protrudes through the associated opening 32 in the base plate 26, thus causing the mounting device 10 to be pre-fixed in its mounted state.

Then the airbag module 38 prefixed in this way can be fastened on the car body side.

Hence, in accordance with the invention, a mounting device 10 and an airbag module 38 are manufactured by which a folded airbag 40 is safely retained both radially and axially by simple means, thus preventing the airbag 40 from twisting relative to the mounting device 10.

The invention claimed is:

1. A mounting device (10) for receiving an airbag package (46) comprising a side airbag (40) having at least one folded portion (44) and an adjacent rolled portion, the mounting device comprising a receiving portion (12) encompassing the airbag package (46) in a substantially ring-shaped manner, which receiving portion can adopt an inserting state for inserting the airbag (40) and a mounted state in which the mounting device (10) retains the airbag (40) by encompassing the same, and comprising a flange portion (14) for body-side arrangement of the mounting device (10) which includes a base plate (26) and a fixing plate (28) which are coupled to each other in the mounted state, wherein a partition panel (20) for separating the at least one folded portion (44) of the airbag package (46) from the rolled portion and for clamping the at least one folded portion (44) between an outer wall (16) of the receiving portion (12) and the partition panel (20) protrudes into the receiving area (18) defined by the receiving portion.

2. The mounting device (10) according to claim 1, wherein the partition panel (20) extends from an outer wall (16) of the receiving portion (12) into the receiving area (18).

3. The mounting device according to claim 2, wherein the partition panel (20) extends perpendicularly to an adjacent outer wall portion (21).

4. The mounting device (10) according to claim 1, wherein the partition panel (20) is configured to be resiliently biased.

5. The mounting device (10) according to claim 1, wherein a cut-out through which a mounting strap (42) of the airbag (40) can be guided is provided in the fixing plate (28) or in the adjacent end of the receiving portion (12).

6. The mounting device (10) according to claim 1, wherein the mounting device (10) can be unfolded for inserting the airbag (40) and/or in that at least one pre-fixing element (30) is provided at the fixing plate (28) and which in the mounted state extends through at least one opening (32) in the base plate (26) for retaining the closed mounted state of the mounting device (10).

7. The mounting device (10) according to claim 1, wherein at least one shaping portion (22) is provided which includes a contact surface (23) which can be adjacent by pressing against a folded outer portion (48) of the airbag package (46).

8. The mounting device (10) according to claim 1, wherein the mounting device (10) is configured in one piece.

9. The mounting device according to claim 8, wherein the mounting device is an injection molded part.

10. An airbag module (38) comprising at least one mounting device (10) according to claim 1, wherein the airbag (40) further has a mounting strap (42) adjacent to the folded portion (44).

11. The airbag module (38) according to claim 10, wherein the receiving portion (12) encompasses and clamps the airbag package (46).

12. The airbag module (38) according to claim 10, wherein the at least one folded outer layer (44) is clamped between the partition panel (20) and the outer wall (16) of the receiving portion (12).

13. The airbag module (38) according to claim 10, wherein the mounting strap (42) is retained by clamping between the base plate (26) and the fixing plate (28) of the flange portion (14).

14. The airbag module (38) according to claim 10, wherein the fixing plate (28) or the end of the receiving portion (12) adjacent thereto includes a cut-out through which the mounting strap (42) is guided so that it contacts the side of the fixing plate (28) opposite to the base plate (26).

15. The airbag module (38) according to claim 10, wherein the mounting strap (42) includes at least one hole and the base plate (26) includes at least one opening (32) which in the mounted state are aligned with each other, the fixing plate (28) having at least one projecting pre-fixing element (30) which in the mounted state passes through the opening (32) and the hole so that the airbag (40) is pre-fixed and/or that the mounting device (10) is kept closed.

16. A mounting device (10) for receiving an airbag package (46) comprising a side airbag (40) having at least one folded portion (44) and an adjacent rolled portion, the mounting device comprising a receiving portion (12) encompassing the airbag package (46) in a substantially ring-shaped manner, which receiving portion can adopt an inserting state for inserting the airbag (40) and a mounted state in which the mounting device (10) retains the airbag (40) by encompassing the same, and comprising a flange portion (14) for body-side arrangement of the mounting device (10) which includes a base plate (26) and a fixing plate (28) which are coupled to each other in the mounted state, wherein at least one shaping portion (22) is provided on an outer wall of the receiving portion, the shaping portion having a contact surface (23) which is adjacent to and presses against an outer portion of the airbag package (46) to urge one of the at least one folded portion and the rolled portion toward one other of the at least one folded portion and the rolled portion.

17. The mounting device according to claim 16, wherein a partition panel (20) for separating at least one folded outer layer (44) of the airbag package (46) from the residual airbag package (46) and for clamping the at least one folded outer layer (44) between the outer wall (16) of the receiving portion (12) and the partition panel (20) protrudes into a receiving area (18).

18. The mounting device (10) according to claim 16, wherein the shaping portion (22) is a part of the receiving portion (12) projecting into the receiving area (18).

19. The mounting device according to claim 18, wherein the shaping portion is a curved land.

20. The mounting device (10) according to claim 16, wherein the shaping portion (22) faces a partition panel (20) at least in the mounted state for clamping the at least one folded outer layer (44) between the shaping portion (22) and the partition panel (20).

* * * * *